United States Patent

[11] 3,552,335

| | | |
|---|---|---|
| [72] | Inventor | Miro Dvirka<br>Long Island City, N.Y. |
| [21] | Appl. No. | 820,923 |
| [22] | Filed | May 1, 1969 |
| [45] | Patented | Jan. 5, 1971 |
| [73] | Assignee | Hagan Industries, Incorporated<br>Corona, N.Y.<br>a corporation of New York |

[54] REFUSE DISPOSAL SYSTEM
28 Claims, 4 Drawing Figs.

| | | |
|---|---|---|
| [52] | U.S. Cl. | 110/8,<br>110/75 |
| [51] | Int. Cl. | F23g 5/00 |
| [50] | Field of Search | 110/7, 8,<br>72, 72B, 75 |

[56] References Cited
UNITED STATES PATENTS

| | | | |
|---|---|---|---|
| 3,395,655 | 8/1968 | Guy | 110/75X |
| 3,295,476 | 1/1967 | Quentin | 110/8 |
| 2,367,165 | 1/1945 | Astradsson | 110/72X |

*Primary Examiner*—Kenneth W. Sprague
*Attorney*—Mason, Fenwick & Lawrence

ABSTRACT: A refuse disposal system including a combustion chamber, means for supporting refuse to be burned, disposed in the combustion chamber, means for charging refuse onto the support means, means for removing ash residue from the combustion chamber, means for discharging the gaseous products of combustion from the combustion chamber and means for supplying a controlled amount of combustion air to the combustion chamber to obtain maximum combustion efficiency of the refuse and prevent excessive temperatures harmful to the structural and mechanical components of the system.

3,552,335

REFUSE DISPOSAL SYSTEM

This invention relates to a refuse disposal system and more particularly to a refuse disposal system having a novel system for supplying a controlled amount of combustion air to the combustion chamber thereof.

The increase in growth and density of many urban areas has necessitated the development of a large capacity refuse disposal system which is effective in the rapid and efficient reduction and disposal of heterogeneous refuse. In the prior art, there have been many large capacity refuse disposal systems developed for municipal, industrial and commercial use. It has been found, however, that such systems have been unsatisfactory in performance in that they are not capable of rapidly and economically reducing and disposing of heterogenous refuse, to provide minimum ash residue in readily disposable form, and minimum pollution of the atmosphere.

Accordingly, it is the principal object of the present invention to provide a novel refuse disposal system.

Another object of the present invention is to provide a novel refuse disposal system for rapidly and efficiently reducing and disposing of heterogenous refuse.

A further object of the present invention is to provide a novel refuse disposal system which is adapted to reduce and dispose of heterogenous refuse to provide a minimum volume and weight of ash residue, and pollution to the atmosphere.

A still further object of the present invention is to provide a novel refuse disposal system involving an incineration process which provides maximum combustion of the refuse, resulting in a smokeless operation.

Another object of the present invention is to provide a novel refuse disposal system including a combustion chamber for burning the refuse wherein a uniform temperature is provided in all parts of the combustion chamber.

A further object of the present invention is to provide a novel refuse disposal system including a combustion chamber for burning the refuse wherein controlled optimum operating combustion chamber temperatures are provided.

A still further object of the present invention is to provide a novel refuse disposal system involving an incineration process for reducing the refuse, wherein the amount of slag produced is reduced or eliminated, thereby reducing the cost of refractory wall maintenance.

Another object of the present invention is to provide a novel refuse disposal system including a combustion chamber wherein comparatively low combustion chamber temperatures are utilized to rapidly and efficiently burn heterogenous refuse.

A further object of the present invention is to provide a novel refuse disposal system including a combustion chamber wherein high temperatures and flame impingement on the refractory walls thereof, as well as the harmful effect of flame and heat penetration below the grates on the mechanical equipment, are minimized.

A still further object of the present invention is to provide a novel refuse disposal system involving the burning of heterogenous refuse in which the particulate emissions in the products of combustion are substantially reduced or eliminated.

Other object and advantages of the present invention will become more apparent to those persons having ordinary skill in the art to which the invention pertains, from the following description taken in conjunction with the accompanying drawings, wherein:

Briefly described, the present invention relates to a refuse disposal system including a combustion chamber, means for supporting refuse to be burned, disposed in the combustion chamber, means for charging refuse onto the support means, means for removing ash residue from the combustion chamber, means for discharging the gaseous products of combustion from the combustion chamber, and means for supplying a controlled amount of combustion air to the combustion chamber. The means for supplying a controlled amount of air to the combustion chamber includes means for supplying overfire air to the combustion chamber above the support means, means for supplying underfire air to the combustion chamber below the support means, and control means operatively connected to the overfire and underfire air supply means for selectively simultaneously increasing the overfire air supply and decreasing the underfire air supply responsive to a temperature above a predetermined temperature of the combustion chamber, and simultaneously decreasing the overfire air supply and increasing the underfire air supply responsive to a temperature below said predetermined temperature of the combustion chamber.

Referring to the drawings, there is illustrated an embodiment of the invention. The embodiment includes a refuse storage enclosure 10, at least one incinerator 11, a settling chamber 12, a gas scrubber unit 13, a controlled induced draft system 14 and an exhaust stack 15. The incinerator 11 includes a chamber 16, a stoker 17 disposed in the combustion chamber, and a controlled air supply system 17a. Associated with the combustion chamber of the incinerator are residue chambers 18 and 19 and a melting chamber 20 for the further reduction of residual organic and inorganic residue.

The refuse storage enclosure 10 is provided with a dumping area 21 where refuse vehicles may be positioned to dump refuse through an opening 22 having an overhead door 23, into a storage pit 24. The refuse from the storage pit may be transported and charged into the incinerator 11 by means of an overhead crane 25, having a charging bucket 26. The refuse charging operation is controlled remotely from an operator's station 27, to charge refuse into a hopper 28 having a closing gate 29 and a charging chute 30 for conveying refuse to the upper end of the stoker 17.

The combustion chamber 16 of the incinerator is defined by an upper wall 31, a bottom wall 32, a front wall 33, a rear wall 34, and sidewalls 35 and 36. The stoker is positioned in the combustion chamber to receive refuse through the charging chute 30, and generally includes an inclined bottom wall 36, a front wall 37, a rear wall 38, and a plurality of stationary and movable grates 39. The plurality of grates 39 is disposed at an angle to the horizontal, and is spaced from the bottom wall 36 of the stoker. A suitable drive mechanism is provided to reciprocate the movable grates of the stoker. Preferably, the grates are reciprocated to provide a stoking action whereby the refuse is caused to tumble along the length of the stoker. Such stoking action functions to expose a maximum area of the refuse for burning.

The residue chamber 18 is interposed between the end of the stoker 17 and the residue chamber 19, and is provided with vertical front and rear walls 40 and 41 and a bottom wall 42. Positioned in the lower end of the residue chamber 18 and extending transversely through an access opening in a sidewall thereof, is a conveyor unit 43. The conveyor unit is utilized for the removal of ash residue charged into the residue chamber 18. The chamber 18 also is partially filled with water having a level just above the level of the conveyor unit for quenching ash residue deposited onto the conveyor.

The residue chamber 19 is provided with a vertical front wall 44, substantially forming a continuation of combustion chamber front wall 33, a rear wall 45, and a bottom wall 46 which is at a higher level than the bottom wall 42 of the residue chamber 18, and below the bottom wall 32 of the combustion chamber. The residue chamber 19 is adapted to receive bulky residue from the stoker 39 which may be removed through a side access door.

The upper end of the vertical wall 45 of chamber 19 terminates below the upper end of wall 37 of the stoker, and a grate 47 which extends between the sidewalls of the combustion chamber, is mounted on the upper ends of the walls 37 and 38. The grate 47 functions to permit ash residue of a size smaller than a predetermined size, to pass into a vertical passageway 48, and ash residue of the predetermined size and larger, generally consisting of unburned bulky residue, to be discharged into the residue chamber 19. The unburned bulky residue discharged into chamber 19 may be kept there until it has completely burned prior to removal through a side access door.

The vertical walls 40 and 45 of the chambers 18 and 19, and the continuation of the sidewalls of the combustion chamber define a restricted vertical passageway 49 intercommunicating the vertical passageway 48 and the melting chamber 20. The upper end wall 40 terminates below the upper end of vertical wall 45, and is provided with a diverter gate 50 which functions to divert ash residue falling through vertical passageway 48 either into residue chamber 18 or the restricted passageway 49 leading to the melting chamber 20.

The combustion chamber 16 is adapted to be operated at temperatures sufficient to burn all inorganic matter in the heterogenous refuse charged onto the stoker 39. The melting chamber 20 is adapted to operate at temperatures substantially higher than the normal operating temperature of the combustion chamber 16 to completely reduce all residual organic material charged into the melting chamber and to melt all inorganic material charged therein. The melting chamber is insulated from the combustion chamber 16 operating at a lower temperature, by means of residue accumulating in the restricted passageway 49. The melting chamber 20 is operated only under conditions where it is insulated from the combustion chamber 16. Melted inorganic material in the melting chamber is discharged through an overflow passageway 51 in a front wall 52 into a quenching chamber 53 having a conveyor 54 for removing the quenched particles consisting of a minimum of unburned organic material and inert materials embedded in inorganic materials. Such residue will consist of a minimum volume and weight, and will be substantially free of decomposable and putrescible materials. It is contemplated that the melting chamber 20 will be operated at a temperature in the range of 2,600° to 2,800° F., which is sufficient to incinerate combustible residual organic materials and to melt most inorganic materials. In comparison, it is contemplated that the combustion chamber 16 will be operated at a temperature in the range of 1,600° to 1,800° F.

Figure 3:
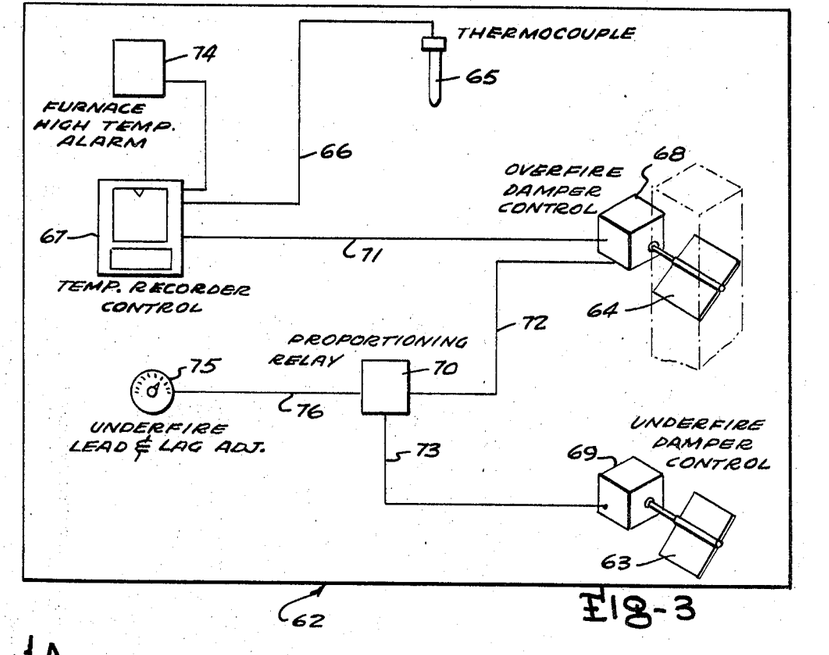
FIG. 3 is a schematic diagrammatic view of the control system for the embodiment illustrated in FIGS. 1a, 1b and 2.

The system 17a for supplying a controlled amount of air to the combustion chamber 16 consists of a blower 55 having a duct system 56 for supplying underfire air through outlet openings 57 in the sidewalls to the underside of the plurality of grates 39, a separate blower 58 having a duct system 59 for supplying overfire air through banks of nozzles 60 and 61 in the sidewalls of the combustion chamber to the upper side of the plurality of grates 39 of the stoker, and a control system 62 as illustrated in FIG. 3. The banks of nozzles 60 and 61 are mounted in the sidewalls of the combustion chamber immediately above the bed of refuse on the stoker 17, and are disposed substantially along the length of the stoker. The supply of underfire or overfire air is controlled by a pair of dampers 63 and 64 in the duct systems 56 and 59 which are operated by the control system 62.

The control system 62 consists of a thermocouple 65 connected by a lead wire 66 to a position proportioning control unit 67 comprising a self-balancing potentiometer, and overfire and underfire damper control motors 68 and 69 comprising position proportioning electrical control motors operatively connected to the dampers 63 and 64. The system further is provided with a proportioning relay 70 for proportioning the input signal of one of the control motors relative to the other, which comprises a bridge balance relay. The control unit 67, the damper control motors, and the proportioning relay are operatively connected by slide wire connections 71, 72 and 73, as illustrated. A high temperature alarm 74 is provided in the system, in addition to an underfire lead and lag rheostat 75 operatively connected to the proportioning relay by means of a lead wire 76.

The control system 62 is operative to maintain the temperature of the combustion chamber within a predetermined temperature range to provide controlled optimum operating conditions for completely and efficiently burning the refuse deposited on the stoker in the incinerator, while emitting a minimum amount of particulate solids entrained in the gaseous products of combustion to be discharged subsequently to the atmosphere. It is preferred that the incinerator be operated in the range of 1,600° and 1,800° F. The temperature in the combustion chamber can be controlled and maintained between these preferred limits by controlling the amounts of overfire and underfire air supplied to the combustion chamber. The combustion chamber temperature may be reduced by increasing the amount of overfire air with or without simultaneously decreasing the underfire air. Similarly, the combustion chamber temperature may be raised by increasing the underfire air with or without increasing the overfire air. The amounts of overfire and underfire air supplied to the combustion chamber can be controlled by adjusting the position of the dampers 63 and 64. This may be accomplished by the use of the control system 62.

In the operation of the control system 62 to maintain the temperature of the combustion chamber between upper and lower temperatures such as 1,800° and 1,600° F., the control unit 67 is adjusted to transmit a command output signal to the damper control motors 68 and 69 to position the dampers 64 and 63 responsive to an input signal from the thermocouple 65. The electric connections of the motors 68 and 69 are adjusted so that the positioning of the dampers 63 and 64 will be in opposite directions so as to increase the air supply in the duct system 56 while decreasing the air supply in duct system 59 and vice versa. The degree of positioning of the dampers 63 and 64 may be proportioned by a proper adjustment of the proportioning relay 70. With such a connection, whenever the thermocouple 65 senses the temperature in the combustion chamber rising above a predetermined set point (for example 1,700° F.), it will transmit a signal to the control unit 67. Correspondingly, the control unit 67 will transmit an output signal to the position control motors 68 and 69 to open the damper 64 and proportionally close damper 63. The effect of such damper adjustment will be to supply a greater amount of overfire air, thus cooling the flame and the products of combustion, and simultaneously decreasing the underfire air to retard combustion. Similarly, whenever the thermocouple senses the temperature in the combustion chamber falling below the predetermined set point (1,700° F.), an appropriate signal will be transmitted to the control unit which correspondingly transmits a command output signal to the position control motors 68 and 69, to close the dampers 64 and open the damper 63. The effect of such adjustment of the damper positions will be to decrease the supply of overfire air, tending to cool the flame, and increase the supply of underfire air to promote combustion of the refuse on the stoker. The combination of locating the thermocouple 65 in the combustion chamber, locating the banks of nozzles for the overfire air just above the bed of refuse, and utilizing separate air supply systems for the overfire and underfire air provides a responsive system for maintaining the temperature of the combustion chamber within a predetermined range of temperatures to provide optimum combustion conditions.

The settling chamber 12 is defined by an upper wall 31a forming a continuation of upper wall 31 of the combustion chamber 16, a rearwardly inclined wall 77 which is common to the gas scrubber 13, a rear wall 78 having the upper end thereof terminating at a level below the upper wall 31a, a front wall 79 spaced from the rear wall 78, and sidewalls 80 and 81.

Depending from the upper wall 31a and extending into the settling chamber is a curtain wall 82. The lower end of the curtain wall projects below the upper level of the rear wall 78, and is spaced from the lower wall 77. In addition, the curtain wall 82 is spaced from the rear wall 78 and front wall 79 to provide a first vertical passageway 83 and a second vertical passageway 84. The vertical passageway 83 intercommunicates an overpass 85 communicating with the combustion chamber 16, and the lower end of the settling chamber, and vertical passageway 84 intercommunicates the lower end of the settling chamber and the inlets of the gas scrubber. It thus will be seen that combustion gases emanating from the burning refuse on the stoker 17 in the combustion chamber will rise and pass through overpass 85, downwardly through vertical passageway 83, around the lower end of the curtain wall 82 in the settling chamber, describing a curved path, upwardly through vertical passageway 84 and horizontally into the inlets of the gas scrubber.

Mounted in the vertical passageway 84 is a baffle member 86 having the rear end thereof spaced from the curtain wall 82 to provide a restricted passageway 87 between the baffle member and the curtain wall. The lower end of the baffle member 86 is elevated relative to the lower end of the curtain wall 82, and the cross-sectional areas of the vertical passageway 83 and the restricted passageway 87 preferably are substantially equal.

When refuse is burned in the combustion chamber 16, the combustion gases emanating from the combustion chamber will carry a certain amount of fly ash through the overpass 85 into the settling chamber. The motion of the gases flowing around the lower end of the curtain wall 82 in the settling chamber results in centrifugal forces being applied on the fly ash particles, causing the particles to follow involute paths of increasing radii from the center of curvature located at the lower end of the curtain wall. As a result of the fly ash particles migrating along involute paths caused by centrifugal forces, gases free of large fly ash particles will follow curved paths of small radii, through the restricted passageway 87, vertical passageway 84 and into the inlet openings of the gas scrubber. However, the fly ash particles following involute paths of increased radii will impinge upon the lower side of the baffle member 86 and front wall 79, causing them to drop to the lower end of the settling chamber. The fly ash precipitated from the stream of gas passing through the settling chamber falls into a water trough 88 common to the settling chamber and the gas scrubber.

The flow of gases obstructed by the baffle member 86 and front wall 79 normally would have the tendency to develop a high-pressure zone below the baffle member, which further would tend to disturb the separation process as described. Such high-pressure zone in the settling chamber, however, may be eliminated by means of a relief passageway interconnecting the high-pressure zone below the baffle member and the passageway 84. The relief passageway normally would be provided adjacent the front wall 79 and for efficient operation of the settling chamber, the cross-sectional area of the relief passageway should be no greater than about five percent of the cross-sectional area of the inlet openings of the gas scrubber.

The gas scrubber 13 consists of a first set of vertical cylindrical conduits 88 and a second set of vertical cylindrical conduits 89 mounted in an enclosure including an upper wall 90, the lower wall 77, the wall 79, a front wall 91, and sidewalls 80a and 81a substantially forming continuations of sidewalls 80 and 81 of the settling chamber. The gas scrubber also is provided with a partition wall 92 providing a first compartment 93 in which the set of conduits 88 are disposed and a second compartment 94 in which the conduits 89 are disposed. As illustrated in FIG. 1b, the upper ends of the conduits extend above the upper wall 90 and the lower ends of the conduits 95 and 96 are open and terminate above the level of the water in the bottom of the enclosure.

Each of the conduits 88 is provided with an inlet conduit 97 at the upper end thereof, which is disposed tangentially relative to the conduit 88 and communicates with the passageway 84 of the settling chamber. Similarly, each of the conduits 89 is provided with a tangentially disposed conduit 98 at the upper end thereof communicating with the compartment 93 of the gas scrubber. In addition, each of the conduits 88 and 89 are provided with sprinklers or a spray at the upper end thereof which inject a spray downwardly through the conduits to entrap residual entrained particles in the combustion gases passing through the gas scrubber.

The induced draft system 14 consists of a blower unit 99 having a pair of inlet conduits 100 and 102 communicating with the compartment 94 of the gas scrubber, and an outlet conduit 103 connected to the stack 15. The induced draft system is operated to induce a draft in the system to draw combustion gases through the gas scrubber and discharge them into the stack 15.

In the operation of the entire system, refuse vehicles may be backed into dumping area 21 to dump refuse through the opening 22 into the storage pit 24. The refuse in the storage pit is transported and dumped into the hopper 28 by means of the crane 25 and the bucket 26, operated from the control station 27. Refuse deposited in the hopper 28 will slide from the chute 30 and be deposited on the upper end of the stoker 17. The periodic stoking action of the stoker caused by the reciprocation of the movable grates thereof will cause the refuse to tumble along the length of the stoker towards the discharge end thereof, providing a bed of burning refuse. The temperature of the combustion chamber is controlled by the controlled air supply system 62, and is maintained preferably in the range of 1,600° to 1,800° F. With the control unit 67 properly set, whenever the temperature in the combustion chamber drops below a selected temperature such as 1,700° F., an output signal is transmitted by the control unit to the damper control motors 68 and 69 to open the damper 63 and proportionally close damper 64 to increase the underfire air and decrease the overfire air. In the event the temperature of the combustion chamber exceeds 1,700° F., the control unit will transmit a signal to the damper control motors 68 and 69 to reposition the dampers 63 and 64 and correspondingly, decrease the amount of underfire air and increase the amount of overfire air. This latter adjustment will have the effect of cooling the flame, thus reducing the temperature of the combustion chamber.

Maintaining the temperature of the combustion chamber in the range of 1,600° to 1,800° F. will have the effect of providing a smokeless operation and eliminating excessive temperatures tending to cause damage to the refractory wall construction of the combustion chamber, and the mechanical components of the stoker and the air supply system. It will be appreciated that the control unit of the controlled air supply system 62 operates to continuously monitor the temperature of the combustion chamber and transmit signals to the damper control motors 68 and 69 to vary the amounts of overfire and underfire air. In addition, it will be noted that the proportioning relay 70 may be adjusted to provide appropriate proportioning between the positioning of the dampers 63 and 64. It further is contemplated that the control units 67 may be utilized to drive the damper control motors having dampers mounted either on the inlet or outlet sides of the blowers 55 and 58. It also is contemplated that the control unit 67 may be used to control the drive of the motors for the blowers 55 and 58.

Figure 1A:
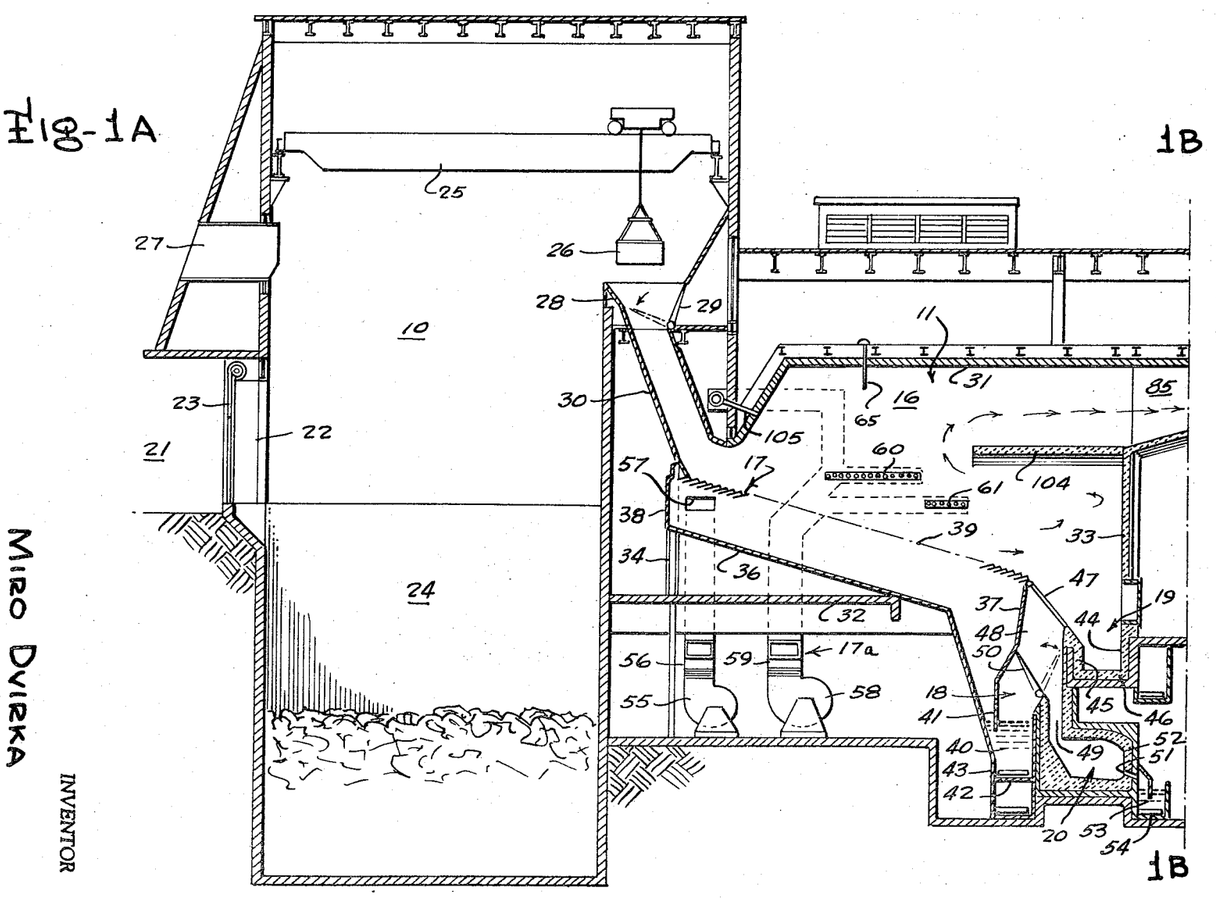
FIGS. 1a and 1b are a vertical cross-sectional view of an embodiment of the invention.
Figure 1B:
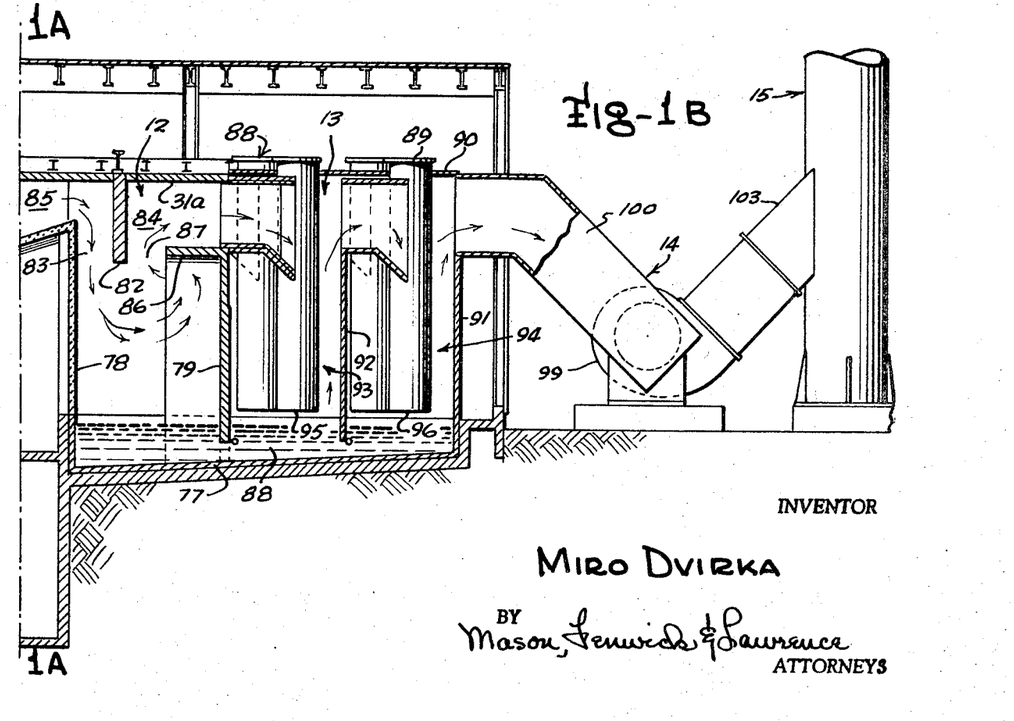
Figure 2:
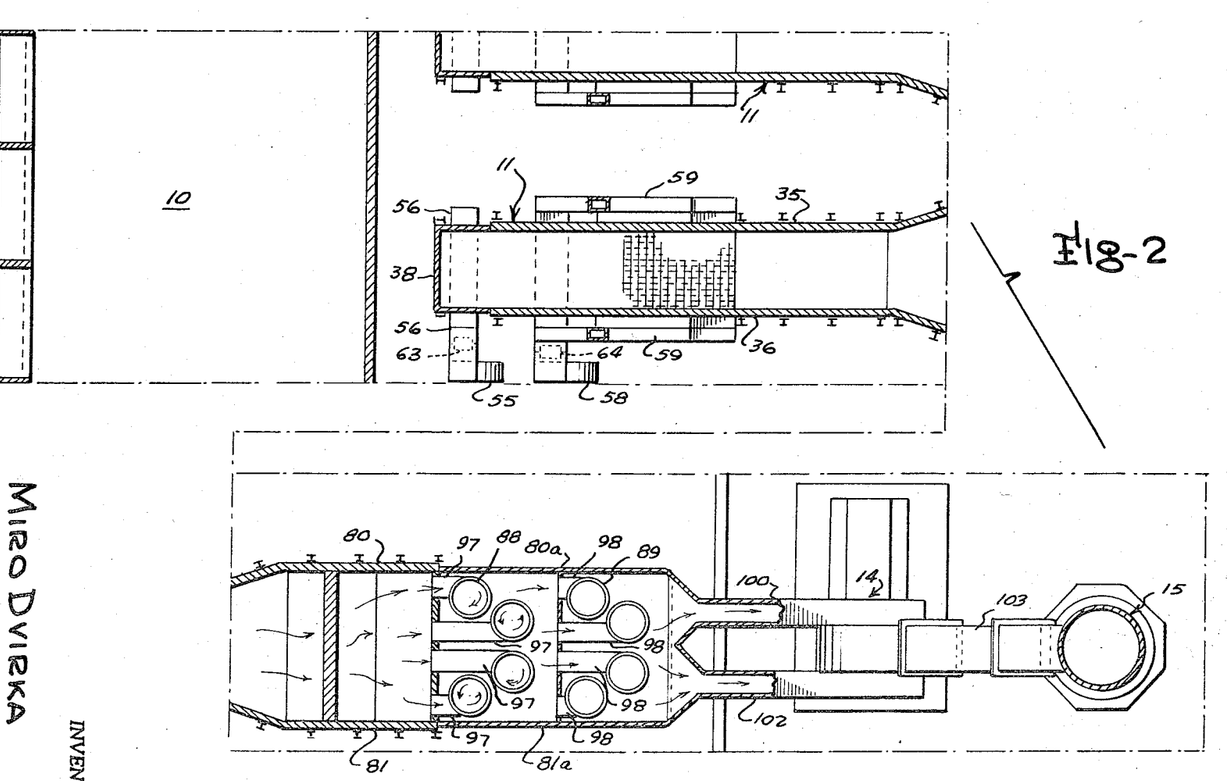
FIG. 2 is a horizontal cross-sectional view of the embodiment illustrated in FIG. 1.

An illustrated in FIG. 1a, the front end of the combustion chamber is provided with a horizontal heat-reflecting wall 104 and may also be provided with a nozzle 105 in the upper back wall thereof, communicating with the duct system 59 to supply additional overfire air to supplement the air supplied through the banks of air nozzles 60 and 61.

Small particles of residue falling between the grates of the stoker 39, are deposited on the bottom wall 36 of the stoker and may be periodically flushed into the residue chamber 18. Ash residue discharged from the lower end of the stoker, is deposited on the grate 47. Small particles of ash residue are adapted to pass through the grate 47 into the passageway 48, while large bulky residue is deposited into the residue chamber 19 where it continues to burn. The bulky residue in residue chamber 19 is removed periodically through a side access door. The smaller size residue passing through the grate 47 and passageway 48 may be diverted either into the residue chamber 18 or the melting chamber 20, depending upon the position of the diverter gate 50. When the gate 50 is in the position as illustrated by the phantom lines in FIG. 1a, the ash residue will be diverted into the residue chamber 18 and eventually onto the conveyor 43.

With the diverter gate 50 in the position as illustrated by the solid lines in FIG. 1a, the ash residue will pass through the restricted passageway 49 into the melting chamber 20. After a sufficient amount of residue has been deposited in the rear end of the melting chamber so that is accumulates in the restricted passageway 49, insulating the melting chamber 20 from the combustion chamber 16, the residue in the melting chamber may be ignited at elevated temperatures in the range of 2,600° to 2,800° F., to burn residual organic matter and melt the inorganic matter of the residue. The molten material in the melting chamber will then pass through the overflow passageway 50 into the quenching chamber 53 where it is removed by means of the conveyor 54. The end product of the melting chamber 20 is a supply of small pellets of inorganic material having organic and inert materials embedded therein, which may be utilized for various purposes including land filling and the like.

With the induced draft system 14 operating, the combustion gases emanating from the combustion chamber 16, will flow through the overpass 85 and vertical passageway 83 into the settling chamber 12. The motion of the gases flowing around the lower end of the curtain wall 82 in the settling chamber produces centrifugal forces, causing a portion of the fly ash particles in the gas stream to follow involute paths of increasing radii from the center 79, curvature located at the lower end of the curtain wall. As a result of the fly ash particles migrating along involute paths, caused by centrifugal forces, gases having smaller particles of fly ash entrained therein will follow cured paths of small radii through the restricted passageway 87 and vertical passageway 84 and enter through the inlet conduits 97 into the interiors of the conduits 88 of the gas scrubber. The larger fly ash particles deflected from the gas stream in the settling chamber, will impinge upon the baffle member 86 and the wall 79, causing such particles to lose their velocity an and fall to the bottom of the settling chamber.

The gases entering the conduits 88 of the gas scrubber will be laden with residual fly ash of a smaller particle size relative to the fly ash separated by the centrifugal forces in the settling chamber, and will traverse downwardly through the conduits 88 with a helical or swirling motion. As the gases traverse through the conduits 88 to be ejected through the openings in the lower ends 95 thereof into the compartment 93, they will contact the water sprays injected into the conduits by the spray units. The contact of such gases with the streams of water will cause the fine fly ash particles to become separated from the combustion gases and be carried by the water into the trough at the lower end of the gas scrubber.

The combustion gases ejected through the lower ends of the conduits 88, will flow upwardly in the compartment 93 and enter the inlet conduits 98 into the interiors of the conduits 89. The gases will again be caused to traverse the conduits 89 with a helical or swirling motion in contact with the water sprays injected into the conduits 89, fly remove any remaining fine fly ash particles from the gas. The scrubbed gases are then caused to flow out of lower ends 96 of the conduits 89, through the compartment 94 and the induced draft system 14, into the stack 15 to be discharged into the atmosphere.

It will be appreciated that the smokeless operation of the burning process in the combustion chamber, the removal of the large fly ash particles in the settling chamber, and the removal of all residual fly ash particles in the gas scrubber, results in the discharge of a combustion gas through the stack into the atmosphere which is relatively free of pollutants. It further will be seen, that by continuously monitoring and adjusting the temperature in the combustion chamber, excessive and low operating temperatures are eliminated, thus providing an efficient burning operation and eliminating harmful effects on the structural components of the combustion chamber and the mechanical components of the stoker and the air supply system.

I claim:

1. A refuse disposal system comprising a combustion chamber, means for supporting refuse to be burned, disposed in said combustion chamber, means for charging refuse onto said support means, means for removing ash residue from said combustion chamber, means for discharging the gaseous products of combustion from said combustion chamber and means for supplying a controlled amount of combustion air to said combustion chamber comprising means for supplying overfire air to said combustion chamber above said support means, means for supplying underfire air to said combustion chamber below said support means, and control means operatively connected to said overfire and underfire air supply means for selectively simultaneously increasing the overfire air supply and decreasing the underfire air supply responsive to a temperature above a predetermined temperature of said combustion chamber, and simultaneously decreasing said overfire air supply and increasing said underfire air supply responsive to a temperature below said predetermined temperature of said combustion chamber.

2. A refuse disposal system according to claim 1, wherein said means for supplying overfire air to said combustion chamber above said support means includes a plurality of nozzles disposed in sidewalls of said combustion chamber, directing air above a bed of refuse on said support means.

3. A refuse disposal system according to claim 1, wherein said control means is operative selectively to increase said overfire air and proportionally decrease said underfire air, and decrease said overfire air and proportionally increase said underfire air.

4. A refuse disposal system according to claim 1, wherein said means for supplying said overfire and underfire air include separate blowers.

5. A refuse disposal system according to claim 4, wherein said control means includes means for controlling the speeds of motors for operating said blowers.

6. A refuse disposal system according to claim 4, wherein said control means includes means for positioning dampers for said blowers.

7. A refuse disposal system according to claim 1, wherein said control means includes a temperature-sensitive means mounted in said combustion chamber.

8. A refuse disposal system according to claim 1, wherein said predetermined temperature substantially lies within the temperature range of 1,600° to 1,800° F.

9. A refuse disposal system according to claim 1, wherein said support means comprises a stoker.

10. A refuse disposal system according to claim 1, wherein said support means comprises a reciprocating type of stoker.

11. A refuse disposal system according to claim 1, wherein said control means includes position proportioning electrical control motors operatively connected to said overfire and underfire air supply means and a position proportioning control unit operable responsive to a signal generated by a thermocouple disposed in said combustion chamber to transmit output signals to said position proportioning electrical control motors.

12. A refuse disposal system according to claim 11, including means for proportioning the input signal of one of said control motors relative to the other of said control motors.

13. A refuse disposal system according to claim 11, wherein said position proportioning control unit comprises a self-balancing potentiometer.

14. A refuse disposal system according to claim 12, wherein said means for proportioning the input signal of one of said control motors comprises a bridge balance relay to provide power to the motor windings.

15. A refuse disposal system according to claim 1, including a settling chamber comprising an inlet passageway and an outlet passageway, said inlet passageway communicating with said combustion chamber, and said outlet passageway communicating with said means for discharging the gaseous products of combustion, said settling chamber and said outlet passageway providing a continuous passageway for combustion gases emanating from said combustion chamber, said inlet and outlet passageways being disposed relative to each other whereby combustion gases passing through said settling chamber describe a curved path about a center of curvature disposed between said passageways, said outlet passageway having an inlet disposed sufficiently adjacent said center of curvature whereby solid particles entrained in said combustion gases passing through said settling chamber migrate along involute paths under the influence of centrifugal forces resulting from the motion of said combustion gases, impinging on a wall of said settling chamber.

16. A refuse disposal system according to claim 1, including a scrubber unit comprising a plurality of cylindrical chambers each having an inlet communicable with said combustion chamber and an axially spaced outlet communicable with said means for discharging said gaseous products of combustion, and means for injecting fluid axially through said cylindrical chambers whereby combustion gases laden with entrained solid particles will traverse through said cylindrical chambers and said entrained solid particles will contact said fluid injected into said cylindrical chambers and separate from the main stream of said combustion gases.

17. A refuse disposal system according to claim 1, including a settling chamber, a first passageway intercommunicating said combustion chamber and said settling chamber, a plurality of cylindrical chambers each having axially spaced inlet and outlet openings, means for injecting fluid axially through said cylindrical chambers, a second passageway intercommunicating said settling chamber and the inlets of said cylindrical chambers, and a third passageway intercommunicating the outlets of said cylindrical chambers and said means for discharging said gaseous products of combustion whereby combustion gases laden with entrained solids particles emanating from said combustion chamber and flowing through said first passageway, said settling chamber and said second passageway, will traverse through said cylindrical chambers and residual entrained solid particles will contact said fluid injected into said cylindrical chambers and separate from the main stream of combustion gases.

18. A refuse disposal system according to claim 1, including a first residue chamber disposed adjacent said combustion chamber, a second residue chamber disposed adjacent said second residue chamber, said residue chambers being disposed adjacent said support means for receiving residue therefrom, and classifying means for receiving residue from said support means operable to permit residue particles smaller than a predetermined size to be discharged into said first residue chamber and to discharge residue particles of said predetermined size or larger into said second residue chamber.

19. A refuse disposal system according to claim 1, including a melting chamber, passage means for conducting residue from said combustion chamber to said melting chamber, means for melting inorganic residue charged into said melting chamber and said melting means being sufficient to melt inorganic residue received from said combustion chamber.

20. A refuse disposal system according to claim 1, including a settling chamber and a scrubber interposed between said combustion chamber and said means for discharging said gaseous products of combustion, and means disposed between said scrubber and said means for discharging said gaseous products of combustion for inducing a draft through said combustion chamber and said scrubber.

21. A refuse disposal system according to claim 1, including a settling chamber and a scrubber unit interposed between said combustion chamber and said means for discharging the gaseous products of combustion, said settling chamber including an inlet passageway and an outlet passageway, said inlet passageway communicating with said combustion chamber, said settling chamber including said inlet and outlet passageways, providing a continuous passageway for combustion gases emanating from said combustion chamber, said inlet and outlet passageways being disposed relative to each other whereby combustion gases passing through said settling chamber describe a curved path about a center of curvature disposed between said passageways, said outlet passageway having an inlet disposed sufficiently adjacent said center of curvature whereby solid particles entrained in said combustion gases passing through said settling chamber migrate along involute paths under the influence of centrifugal forces resulting from the motion of said combustion gases, impinging on a wall of said settling chamber, and said scrubber unit comprising a plurality of cylindrical chambers each having an inlet communicable with the outlet passageway of said settling chamber and an axially spaced outlet communicable with said means for discharging said gaseous products of combustion, and means for interjecting fluid axially through said cylindrical chambers whereby combustion gases laden with residual entrained solid particles will traverse through said cylindrical chambers and said residual entrained solid particles will contact said fluid injected into said cylindrical chambers and separate from the main stream of said combustion gases.

22. A refuse disposal system according to claim 21, including a first residue chamber disposed adjacent said combustion chamber, a second residue chamber disposed adjacent said second residue chamber, said residue chambers being disposed adjacent said support means for receiving residue therefrom, and classifying means for receiving residue from said support means operable to permit residue particles smaller than a predetermined size to be discharged into said first residue chamber and to discharge residue particles of said predetermined size or larger into said second residue chamber.

23. A refuse disposal system according to claim 21, including a melting chamber, passage means for conducting residue from said combustion chamber to said melting chamber, means for melting inorganic residue charged into said melting chamber and said melting means being sufficient to melt inorganic residue received from said combustion chamber.

24. A system for supplying a controlled amount of combustion air to a combustion chamber having means for supporting refuse to be burned therein, comprising means for supplying overfire air to said combustion chamber above said support means, means for supplying underfire air to said combustion chamber below said support means, and control means operatively connected to said overfire and underfire air supply means for selectively simultaneously increasing the overfire air supply and decreasing the underfire air supply responsive to a temperature above a predetermined temperature of said combustion chamber, and simultaneously decreasing said overfire air supply and increasing said underfire supply responsive to a temperature below said predetermined temperature of said combustion chamber.

25. A system for supplying a controlled amount of combustion air to a combustion chamber having means for supporting refuse to be burned therein according to claim 24, wherein said means for supplying overfire air to said combustion chamber above said support means includes a plurality of nozzles disposed in sidewalls of said combustion chamber, directing air immediately above a bed of refuse on said support means.

26. A system for supplying a controlled amount of combustion air to a combustion chamber having means for supporting refuse to be burned therein, according to claim 24, wherein said control means is operative selectively to increase said overfire air and proportionally decrease said underfire air, and decrease said overfire air and proportionally increase said underfire air.

27. A system for supplying a controlled amount of combustion air to a combustion chamber having means for supporting refuse to be burned therein according to claim 24, wherein said control means includes position proportioning electrical control motors operatively connected to said overfire and underfire air supply means and a position proportion control unit operable responsive to a signal generated by a thermocouple disposed in said combustion chamber to transmit output signals to said position proportioning electrical control means.

28. A system for supplying a controlled amount of combustion air to a combustion chamber having means for supporting refuse to be burned therein, according to claim 27, including means for proportioning the input signal of one of said control motors relative to the other of said control motors.

UNITED STATES PATENT OFFICE
CERTIFICATE OF CORRECTION

Patent No. 3,552,335   Dated January 5, 1971

Inventor(s) Miro Dvirka

It is certified that error appears in the above-identified patent and that said Letters Patent are hereby corrected as shown below:

In column 3, line 19, "inorganic" should be --organic--; column 3, lines 33 and 34, delete "a minimum of unburned orga material and"; column 3, line 36, delete "substantially"; col 4, line 52, delete the comma after "overfire air"; column 7, line 20, delete "organic and"; column 8, line 13 (claim 1), should be --means, separate means for supplying underfire air to said combustion--; column 9, line 18 (claim 16), should be --chamber and a longitudinally spaced outlet communicable wit said--; column 9, line 20 (claim 16), should be --and means for injecting fluid longitudinally through said cylinder--; column 9, line 29 (claim 17), should be --ty of cylindrical chambers each having longitudinally spaced inlet and--; colun line 30 (claim 17), should be --outlet openings, means for injecting fluid longitudinally through said--; column 10, lir 17 (claim 21), should be --bustion, and means for injecting fluid axially through said--; and column 10, line 46 (claim 2 should be --port means, separate means for supplying underfir air to said com--.

Signed and sealed this 3rd day of October 1972.

(SEAL)
Attest:

EDWARD M. FLETCHER, JR.
Attesting Officer

ROBERT GOTTSCHALK
Commissioner of Pat